Patented Apr. 3, 1951

2,547,910

UNITED STATES PATENT OFFICE 2,547,910

ACYLATED DERIVATIVES OF CERTAIN DIAMINO DISTYRYLBENZENE DISULFONIC ACIDS

Heinrich Häusermann and Reinhard Zweidler, Basel, Switzerland, assignors to J. R. Geigy A. G., Basel, Switzerland, a Swiss firm No Drawing. Application August 8, 1949, Serial No. 109,224. In Switzerland August 13, 1948

4 Claims. (Cl. 260—507)

The present invention is concerned with the manufacture of new water-soluble optical brightening-agents, which are remarkable for producing a desirable blue to greenish-blue fluorescence of a particularly intense nature and which can easily be produced from readily available starting materials in very good yield and with a high degree of purity.

Optical brightening agents are more or less colourless substances which absorb light in the ultraviolet part of the spectrum and emit a violet to greenish blue fluorescence, giving the articles containing them a purer or a pure white appearance. Optical brightening agents which fluoresce blue to bluish green are particularly sought after because of the especially pure white appearance to which they give rise.

The process for the manufacture of the new optical brightening agents consists in converting 1,4-di-(nitrostyryl)-benzene-disulfonic acids of the general formula

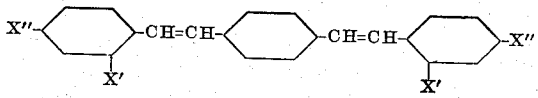

wherein one pair of the X' and X" pairs represent nitro groups, the other pair for sulfonic acid groups, into the corresponding diamino-disulfonic acids by reduction of the nitro groups and then acylating the diamino disulfonic acids so obtained by the introduction of a carbacyl radical. In the description the organic carboxylic acid radicals introduced in this way are termed "carbacyl radicals." This expression is used to make it clear that acyl radicals of other organic acids, such as, e. g. those of organic sulfonic, phosphoric or arsinic acids are excluded. For brightening agents radicals of lower fatty acids, e. g. acetic or propionic acid, of substituted lower fatty acids, e. g. phenacetic or phenoxyacetic acid, of lower organic derivatives of carbonic acid, e. g. of a carbamic acid as well as of a mono-ester of carbonic acid, bound directly to the amino group via the (C=O)-group are preferred. Besides those defined above the 1,4-di-(nitrostyryl)-benzene-disulfonic acids can contain still other suitable substituents.

The 1,4-di-(nitrostyryl)-benzene-disulfonic acids usable according to the present invention can be prepared according to copending patent application Ser. No. 109,223 (filed August 8, 1949). They can be reduced in acetic acid with zinc dust or with iron and acid by Béchamp's method.

The acylation of the 1,4-di-(aminostyryl)-benzenedisulfonic acids is suitably carried out by treatment of the aqueous solution of their alkali salts with acylating agents according to the definition given above, in the presence of acid binding agents where necessary. It may sometimes by advantageous to carry out the acylation in a two phase system by using solutions of the acylating agent in inert organic solvents, e. g., in liquid aromatic hydrocarbons such as benzene, toluene, xylenes or in chlorinated aliphatic hydrocarbons such as, e. g., trichlorethylene.

The new optical brightening agents are greenish yellow to yellow coloured powders, which, when dissolved in water in the form of their alkali salts, give slightly to strongly fluorescent solutions. They have an affinity for fibres of animal and vegetable origin, for regenerated cellulose fibres, casein fibres, superpolyamide fibres and the like. They can be brought on to the material to be brightened by known methods, e. g. by incorporation in washing or rinsing liquors or by dyeing from a dyebath made up with them. Thanks to their intense greenish-blue to blue fluorescence they can also be employed in admixture with red fluorescing brightening agents in order to improve the white shades produced by the latter.

The following examples serve further to illustrate and explain the invention without limiting it, however. Parts are by weight and temperatures in degrees centigrade. The ratio of parts by weight to parts by volume is that of kilograms to litres.

Example 1

25 parts of cast iron filings are suspended at 60–70° in 300 parts of water and acidified with 2.5 parts of acetic acid. After 5–10 minutes 500 parts of water are added, it is heated to boiling and 30.4 parts of the potassium salt of 4'.4"-dinitro-1.4-distyrylbenzene - 2'.2"-disulfonic acid are added within 2 hours and the mixture is boiled under reflux for 4 hours, while agitating vigorously. Next the reaction mixture is neutralised with 15% soda solution until no more iron is present in ionised form, and filtration then carried out. The residue of iron is extracted twice with 200 parts of boiling water and the yellowish green fluorescing solution is acidified with 30 parts of hydrochloric acid (30%) at 70°.

The 4'.4"-diamino-1.4-distyryl-benzene-2'.2"-disulfonic acid, thus precipitated is filtered off, washed and dried. The yield is 22–23 parts. The product is a brownish grey powder which dissolves in dilute caustic soda to give a yellow solution which fluoresces an intense green.

10 parts of 4′,4″-diamino-1,4-distyryl-benzene-2′,2″-disulfonic acid are dissolved in 500 parts of water with the addition of 2.5 parts of soda ash. 5 parts of acetic anhydride are then added at 30–40° while stirring. The acetylation product is completely precipitated by the addition of 50 parts of common salt, filtered and dried. In this way about 12 parts of a yellow powder are obtained, whose dilute aqueous solution fluoresces an intense blue in daylight.

The compound is excellently suited for brightening textiles, whereby the treated fibres acquire a greenish blue fluorescence in daylight, giving them a pure white appearance. A similar product is obtained by using 6.4 parts of propionic anhydride instead of 5 parts of acetic anhydride.

*Example 2*

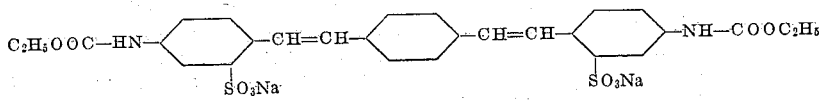

10 parts of the 4′,4″-diamino-1,4-distyryl-benzene-2′,2″-disulfonic acid described in Example 1 are dissolved in 500 parts of water containing 2.5 parts of soda ash; 7.5 parts of crystalline sodium acetate are added and then 5.8 parts of ethyl chloroformate, while stirring and at 25–30°. After a short time the reaction product begins to separate out as a yellowish precipitate. Precipitation is completed by the addition of 50 parts of common salt, the urethane obtained is filtered off and dried. The yield is 14 parts of a yellowish powder having properties similar to those of the final product described in Example 1.

Instead of 5.8 parts of ethyl chloroformate, 5.1 parts of methyl chloroformate may be used, whereby a similar product is obtained.

*Example 3*

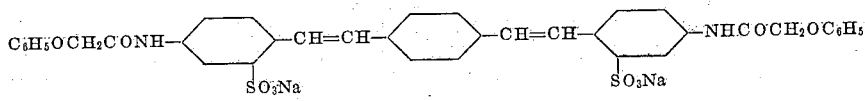

10 parts of the 4,4′-diamino-1,4-distyryl-benzene-2′,2″-disulfonic acid prepared as described in Example 1 are dissolved in 500 parts of water and 2.5 parts of soda ash and warmed to 55–60°. Next a solution of 8 parts phenoxyacetyl chloride in 10 parts of trichlorethylene is added, with stirring, which is continued while slowly dripping in 15% soda solution so as to give a weak alkaline reaction to brilliant yellow, until no more soda is absorbed. After adding 50 parts of common salt the reaction mixture is allowed to cool, the phenoxyacetyl compound is filtered off and dried. 16–17 parts of a yellow powder are thus obtained, having similar properties to the final product of Example 1. Instead of 8 parts of phenoxyacetyl chloride, 8.7 parts of cresoxyacetyl chloride or 9.7 parts of chlorophenoxyacetyl chloride may be used, whereby similar products are obtained.

In similar manner the corresponding phenylacetyl product is obtained when 7.5 parts of phenylacetyl chloride are used instead of phenoxyacetyl chloride.

*Example 4*

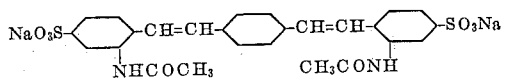

30.4 parts of the potassium salt of 2′,2″-dinitro-1,4-distyryl-benzene-4′,4″-disulfonic acid are reduced under the conditions described in Example 1 to 2′,2″-diamino-1,4-distyryl-benzene-4′,4″-disulfonic acid. Yield: 22 parts of a yellowish powder which dissolves in diluted aqueous soda-ash solution to give a yellow solution with a greenish blue fluorescence. 10 parts of the diamino-disulfonic acid obtained are dissolved in 500 parts of water and 2.5 parts of soda-ash and acetylated at 30–40° with 5 parts of acetic acid anhydride. On addition of 100 parts of common salt the diacetyl compound separates out as a solid, yellow precipitate. The product is filtered off under suction and dried. 12–13 parts of a yellowish powder which is readily soluble in water are obtained. The aqueous solution has a strong blue fluorescence in daylight. When textile fibres having a yellow appearance are treated with an aqueous solution of this compound then the treated material acquires a bright blue fluorescence in daylight, giving it a pure white appearance.

*Example 5*

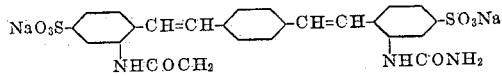

10 parts of 2′,2″-diamino-1,4-distyrylbenzene-4′,4″-disulfonic acid obtained as in Example 4 are dissolved in 500 parts of water with the addition of 2.5 parts of soda-ash, 5 parts of potassium cyanate and 4 parts acetic acid added and the whole stirred for 1 hour at 25–35°. The diureide formed is salted out with 100 parts of common salt, isolated and dried. In this way 12–13 parts of a yellow powder are obtained, whose aqueous solution fluoresces an intense blue in daylight. This product too is eminently suitable for lightening textile materials with a yellowish appearance, since treated fibres acquire a blue to bluish green fluorescence in daylight.

*Example 6*

25 parts of prebleached, regenerated cellulose are treated for 15 minutes at 40° with a solution of 0.025 part of the sodium salt of 4′,4″-diphenoxy-acetylamino-1,4-distyrylbenzene-2′,2″-disulfonic acid in 1000 parts of water, with the addition of 1 part of sodium sulfate. After washing and drying, the treated goods have a much whiter appearance and have a bluish green glow in ultraviolet light.

*Example 7*

25 parts of prebleached woollen yarn are treated for 30 minutes at 40–50° with a solution of 0.025 part of the sodium salt of 4′,4″-diacetylamino-1,4-distyrylbenzene-2′,2″-disulfonic acid in 1000 parts of water, with the addition of 0.25 part of formic acid. The treated wool has, after washing and drying, a much whiter appearance than the untreated yarn.

What we claim is:

1. The compound of the formula:

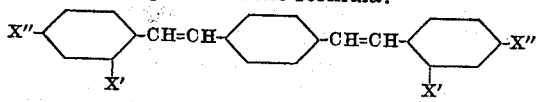

wherein each of one pair of the X' and X'' pairs represents a sulfonic acid group attached to the adjacent benzene nucleus by the S atom, and each of the other pair represents an R.CO.NH group attached to the adjacent benzene nucleus by the amino N, R standing for a member selected from the group consisting of lower alkoxy, alkyl, phenylalkyl, phenoxyalkyl and amino, the alkyl being in each case lower alkyl.

2. The compound of the formula:

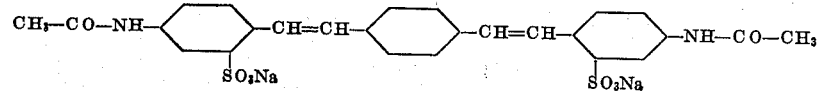

3. The compound of the formula:

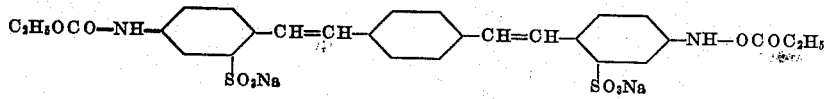

4. The compound of the formula:

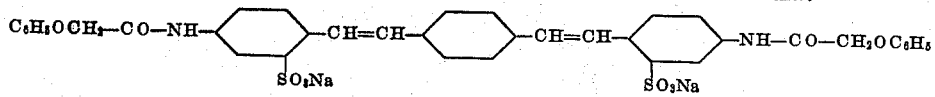

HEINRICH HÄUSERMANN.
REINHARD ZWEIDLER.

No references cited.